(12) United States Patent
Su et al.

(10) Patent No.: US 11,018,498 B2
(45) Date of Patent: May 25, 2021

(54) EMARKER-EQUIPPED CABLE AND POWER MANAGEMENT METHOD THEREOF

(71) Applicant: VIA LABS, INC., New Taipei (TW)

(72) Inventors: Feng-Kuan Su, New Taipei (TW); Yu-Lung Lin, New Taipei (TW); Yi-Te Chen, New Taipei (TW)

(73) Assignee: VIA LABS, INC., New Taipei (TW)

( * ) Notice: Subject to any disclaimer, the term of this patent is extended or adjusted under 35 U.S.C. 154(b) by 469 days.

(21) Appl. No.: 15/942,717

(22) Filed: Apr. 2, 2018

(65) Prior Publication Data

US 2018/0287375 A1 Oct. 4, 2018

Related U.S. Application Data

(63) Continuation-in-part of application No. 15/868,422, filed on Jan. 11, 2018.

(Continued)

(30) Foreign Application Priority Data

Oct. 27, 2017 (TW) ................................ 106137054

(51) Int. Cl.
*H02H 7/22* (2006.01)
*H02H 1/00* (2006.01)
(Continued)

(52) U.S. Cl.
CPC ......... *H02H 7/226* (2013.01); *G06F 13/4286* (2013.01); *H02H 1/0007* (2013.01);
(Continued)

(58) Field of Classification Search
CPC ......... H02H 3/00–52; H02H 5/04–048; H02H 9/02; H02H 9/04; H02H 7/226;
(Continued)

(56) References Cited

U.S. PATENT DOCUMENTS

| 2010/0244587 A1 | 9/2010 | Tiovola et al. |
| 2015/0346790 A1 | 12/2015 | Nokia Corp |

(Continued)

FOREIGN PATENT DOCUMENTS

| CN | 101861574 | 10/2010 |
| CN | 104978296 | 10/2015 |

(Continued)

OTHER PUBLICATIONS

Taiwan Patent Office "Office Action" dated Apr. 15, 2019, Taiwan.
(Continued)

*Primary Examiner* — Thienvu V Tran
*Assistant Examiner* — Ivan Laboy
(74) *Attorney, Agent, or Firm* — WPAT, PC (57) ABSTRACT

An eMarker device is used in a cable electrically connected between a first port and a second port, wherein the cable includes a configuration channel communication wire. The eMarker device comprises: a first eMarker disposed near the first port and including a first active protection module coupled to the configuration channel communication wire, wherein the first eMarker is electrically connected to a first power pin of the first port and a second power pin of the second port; and a second eMarker disposed near the second port and including a second active protection module coupled to the configuration channel communication wire, wherein either of the first active protection module and the (Continued)

second active protection module changes an electric characteristic of the configuration channel communication wire to have the first port detect a disconnecting status of the second port when a specified event happens.

25 Claims, 9 Drawing Sheets

Related U.S. Application Data (60) Provisional application No. 62/479,342, filed on Mar. 31, 2017.

(51) Int. Cl.
*H02H 5/04* (2006.01)
*H02H 3/20* (2006.01)
*G06F 1/26* (2006.01)
*G06F 13/42* (2006.01)

(52) U.S. Cl.
CPC ............... *H02H 3/20* (2013.01); *H02H 5/04* (2013.01); *H02H 5/041* (2013.01); *G06F 1/266* (2013.01); *G06F 13/4282* (2013.01); *G06F 2213/0042* (2013.01)

(58) Field of Classification Search
CPC ............... H02H 1/0007; H02H 1/0084; H04L 12/40045; G06F 1/206; G06F 1/26; G06F 1/263; G06F 1/266; G06F 1/28; G06F 1/30; G06F 1/3215; G06F 1/4068; G06F 13/385; G06F 13/42; G06F 13/4282; G06F 13/4286; G06F 21/85; G06F 2213/0042
See application file for complete search history.

(56) References Cited

U.S. PATENT DOCUMENTS

| | | | |
|---|---|---|---|
| 2018/0128694 A1* | 5/2018 | Wee | G01K 7/01 |
| 2018/0143674 A1* | 5/2018 | Card | G06F 1/266 |
| 2018/0248356 A1* | 8/2018 | Klein | G06F 13/4282 |

FOREIGN PATENT DOCUMENTS

| | | |
|---|---|---|
| CN | 204791001 | 11/2015 |
| CN | 106055507 | 10/2016 |
| CN | 106058959 | 10/2016 |
| EP | 2930588 | 10/2015 |
| EP | 3148031 | 3/2017 |
| TW | 526216 | 7/2016 |
| TW | 201636858 | 10/2016 |

OTHER PUBLICATIONS

State Intellectual Property Office, SIPO, "Office Action" dated Dec. 2, 2019.
Designing a Type-C Electronically Marked Cable—Part 1. Vasudevan, Gayathri Jun. 28, 2016. 11 pp., Consumer Electronics.
Littelfuse, USB-C Threats and Protection. Connector Innovation Forum Electronica Shanghai. Mar. 15, 2017, Confidential and Proprietary | Littelfuse, Inc.
European Patent Office , "European search report", dated Jun. 6, 2018.
1. Universal Serial Bus Type-C Cable and Connector Specification. Revision 1.0. USB3.0 Promoter Group. Aug. 11, 2014. pp. 122-124, 147-148, 153, 162-165.
Taiwan Patent Office "Office Action" dated Oct. 6, 2020, Taiwan.
State Intellectual Property Office, SIPO, "Office Action" dated Nov. 6, 2020.

* cited by examiner

EMARKER-EQUIPPED CABLE AND POWER MANAGEMENT METHOD THEREOF

CROSS-REFERENCE TO RELATED APPLICATIONS

The present application is a continuation-in-part application claiming benefit from a parent US patent application bearing a Ser. No. 15/868,422 and filed Jan. 11, 2018, contents of which are incorporated herein for reference.

FIELD OF THE INVENTION

The present invention relates to an eMarker device, and more particularly, to a USB type-C eMarker device. The present invention also relates to a cable equipped with an eMarker device and a power management method for use with an eMarker device for active and self-initialized protection of abnormal events such as over-current, over-voltage and/or over-temperature protection events.

BACKGROUND OF THE INVENTION

USB (universal serial bus) type-C is an emerging and versatile interface standard; it not only supports typical USB data interconnect, but also includes various power supply options for supplying power from an electronic device to another electronic device, such as: supplying power from a portable power bank to a mobile phone, or supplying power from a host computer to a peripheral monitor, etc. The power supply options of USB type-C may include: 5V×0.5 A of USB 2.0 (V and A respectively representing volt and ampere), 5V×0.9 A of USB 3.1, 5V×1.5 A of USB BC 1.2 (for USB type-A connector, with BC being battery charging), 5V×1.5 A (for USB type-C connector), 5V×3.0 A (for USB type-C connector), and a configurable supply of USB PD (power delivery) up to 20V×5 A (for USB type-C connector).

To adapt the various power supply options, a USB type-C cable may be equipped with a CC (configuration channel) wire and an eMarker; when the cable connects a port which supports USB PD and is capable of operating as a source for providing power, the port may send a request message over the CC wire; the eMarker in the cable may receive the request message, and then respond a data message over the CC wire, such that the port may obtain information related to the cable, such as rated and/or tolerable voltage, current and/or power of the cable.

Because there are significant differences among powers of the different power supply options, supply safety becomes a main concern. For supply safety, when a port which operates as a (power) source connects another port which operates as a (power) sink via a USB type-C cable, if both the two port support USB PD, the two ports may interchange alert messages of over-voltage and over-current. In other words, for the aforementioned power safety mechanism to work, a key requirement is that both the source port and the sink port must support USB PD. However, support of USB PD is not mandatory for a USB type-C port; if any one of the source port and the sink port does not support USB PD, such power safety mechanism will fail to work.

SUMMARY OF THE INVENTION

An object of the present invention is to provide an eMarker device for overcoming the defects of conventional power safety mechanisms.

The present invention also provides a cable including the eMarker device, and a power management method of the cable.

In an aspect of the present invention, an eMarker device is used in a cable electrically connected between a first port and a second port, wherein the cable includes a configuration channel communication wire. The eMarker device comprises: a first eMarker disposed near the first port and including a first active protection module coupled to the configuration channel communication wire, wherein the first eMarker is electrically connected to a first power pin of the first port and a second power pin of the second port; and a second eMarker disposed near the second port and including a second active protection module coupled to the configuration channel communication wire, wherein either of the first active protection module and the second active protection module changes an electric characteristic of the configuration channel communication wire to have the first port detect a disconnecting status of the second port when a specified event happens.

In another aspect of the present invention, a cable to be electrically connected between a first port and a second port comprises: a configuration channel communication wire; a first eMarker disposed near the first port and including a first active protection module coupled to the configuration channel communication wire, wherein the first eMarker is electrically connected to a first power pin of the first port and a second power pin of the second port; and a second eMarker disposed near the second port and including a second active protection module coupled to the configuration channel communication wire, wherein either of the first active protection module and the second active protection module changes an electric characteristic of the configuration channel communication wire to have the first port detect a disconnecting status of the second port when a specified event happens.

In a further aspect of the present invention, a cable is electrically connected between a first port and a second port and includes a configuration channel communication wire, and a power management method of the cable comprises: changing an electric characteristic of the configuration channel communication wire with a first eMarker to have the first port detect a disconnecting status of the second port when a first specified event happens near the first port; and changing an electric characteristic of the configuration channel communication wire with a second eMarker to have the first port detect a disconnecting status of the second port when a second specified event happens near the second port.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
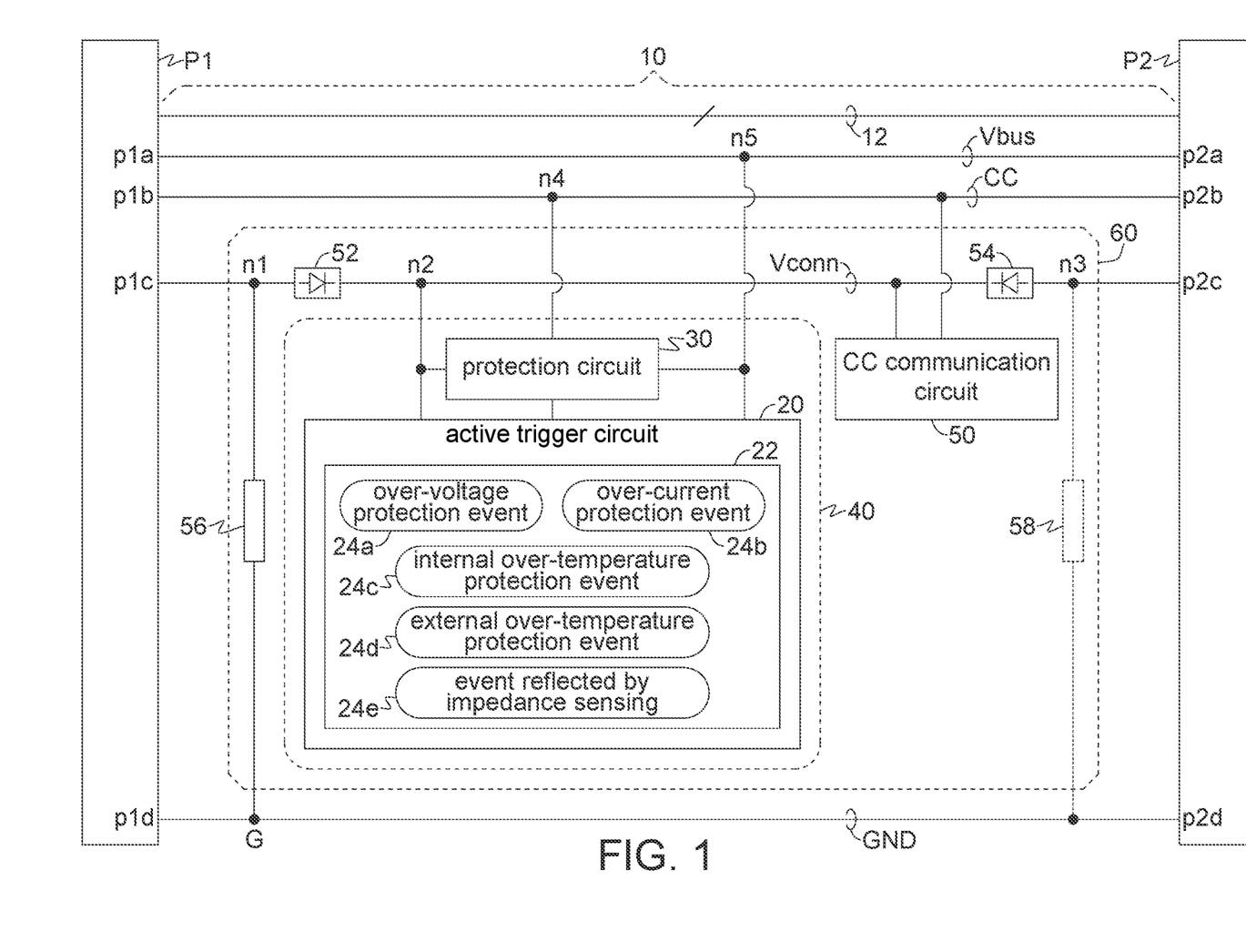
FIG. 1 is a schematic circuit block diagram illustrating a cable including an eMarker device according to an embodiment of the present invention.

Please refer to FIG. 1, which schematically illustrating a cable 10, which is, for example, a USB type-C cable for connecting two ports P1 and P2. The two ports P1 and P2 may respectively belong to two different electronic devices (not shown). The cable 10 includes an eMarker 60, a CC wire, at least a Vbus wire and at least a GND wire, wherein the Vbus wire may be a bus power wire, the CC wire may be a configuration channel wire, and the GND wire may be a ground wire.

The cable 10 includes a plurality of data wires 12 for supporting USB data interconnect, e.g., a pair of differential signal wires for supporting high-speed interconnect of USB 2.0, several sideband signal wires and/or multiple differential signal wires for supporting SuperSpeed interconnect of USB 3.1.

In this embodiment, the port P1 includes pins p1$a$ to p1$d$; the pin p1$a$ may be a Vbus (bus power) pin defined in USB type-C specification, the pin p1$d$ may be a GND (ground) pin defined in USB type-C specification; the pin p1$b$ may be one of CC1 and CC2 pins defined in USB type-C specification, and the pin p1$c$ may be the other one of the CC1 and CC2 pins. Similarly, the port P2 may include pins p2$a$ to p2$d$; the pin p2$a$ may be a Vbus pin defined in USB type-C specification, the pin p2$d$ may be a GND pin defined in USB type-C specification; the pin p2$b$ may be one of CC1 and CC2 pins defined in USB type-C specification, and the pin p2$c$ may be the other one of the CC1 and CC2 pins.

When the ports P1 and P2 mutually connect via the cable 10, the pin p1$a$ of the port P1 may be coupled to the pin p2$a$ of the port P2 via the Vbus wire, the pin p1$b$ of the port P1 may be coupled to the pin p2$b$ of the port P2 via the CC wire, and the pin p1$d$ of the port P1 may be coupled to the pin p2$d$ of the port P2 via the GND wire.

In addition, the cable 10 further includes isolation elements 52 and 54 arranged on a Vconn wire, wherein the isolation element 52 may be coupled between nodes n1 and n2, and the isolation element 54 may be coupled between nodes n2 and n3. When the ports P1 and P2 connect via the cable 10, the pin p1$c$ of the port P1 may be coupled to the node n1, the pin p2$c$ of the port P2 may be coupled to the node n3, and the isolation elements 52 and 54 may prevent end-to-end traverse between the pins p1$c$ and p2$c$ along the Vconn wire.

The cable 10 may further include two impedances 56 and 58. The impedance 56 is coupled between the node n1 and a node G of the GND wire, the impedance 58 is coupled between the node n3 and the node G. When the cable 10 connects the port P1, the cable 10 may present a terminal resistor, e.g., the resistor Ra defined in USB type-C specification, between the nodes n1 and G by the impedance 56. Similarly, when the cable 10 connects the port P2, the cable 10 may present a terminal resistor, e.g., the resistor Ra defined in USB type-C specification, between the nodes n3 and G by the impedance 58. In an embodiment, the impedances 56 and 58 for presenting the resistor Ra may be implemented by one single impedance; e.g., the impedance 58 may be omitted.

The eMarker 60 of the cable 10 may include a CC communication circuit 50 coupled to the CC wire at a node n4, and further include an active protection module 40 to implement the invention. In an embodiment, the CC communication circuit 50, the active protection module 40, the isolation elements 52 and 54, and the impedances 56 and 58 may be packaged in a same eMarker chip. In another embodiment, the CC communication circuit 50 and the active protection module 40 may be packaged in a same eMarker chip, while the isolation elements 52 and 54 and/or the impedances 56 and 58 may be external elements.

When the ports P1 and P2 connect via the cable 10, if one of the two ports P1 and P2 operates as a (power) source and the other operates as a (power) sink, the source port may supply power to the sink port. For convenience of discussion, it is assumed that the port P1 is the source port and the port P2 is the sink port.

As previously explained, the supply safety mechanism of USB PD works only if both the ports P1 and P2 support USB PD. If either one of the two ports does not support USB PD, such supply safety mechanism will not work. In addition, the supply safety mechanism of USB PD fails to consider protecting the cable and eMarker. Besides, under USB PD specification, an eMarker is only designed to passively respond messages after receiving request messages from a port without actively initiating any supply safety mechanism.

Figure 2:
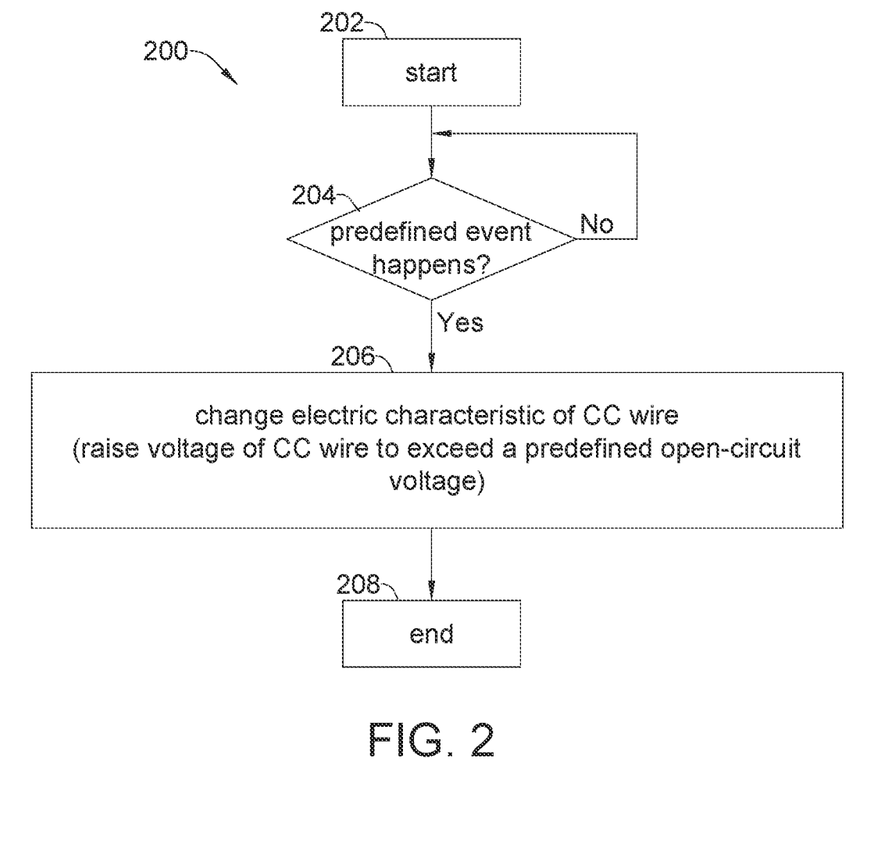
FIG. 2 is a flowchart schematically illustrating a power manage method according to an embodiment of the present invention.
Figure 3A:
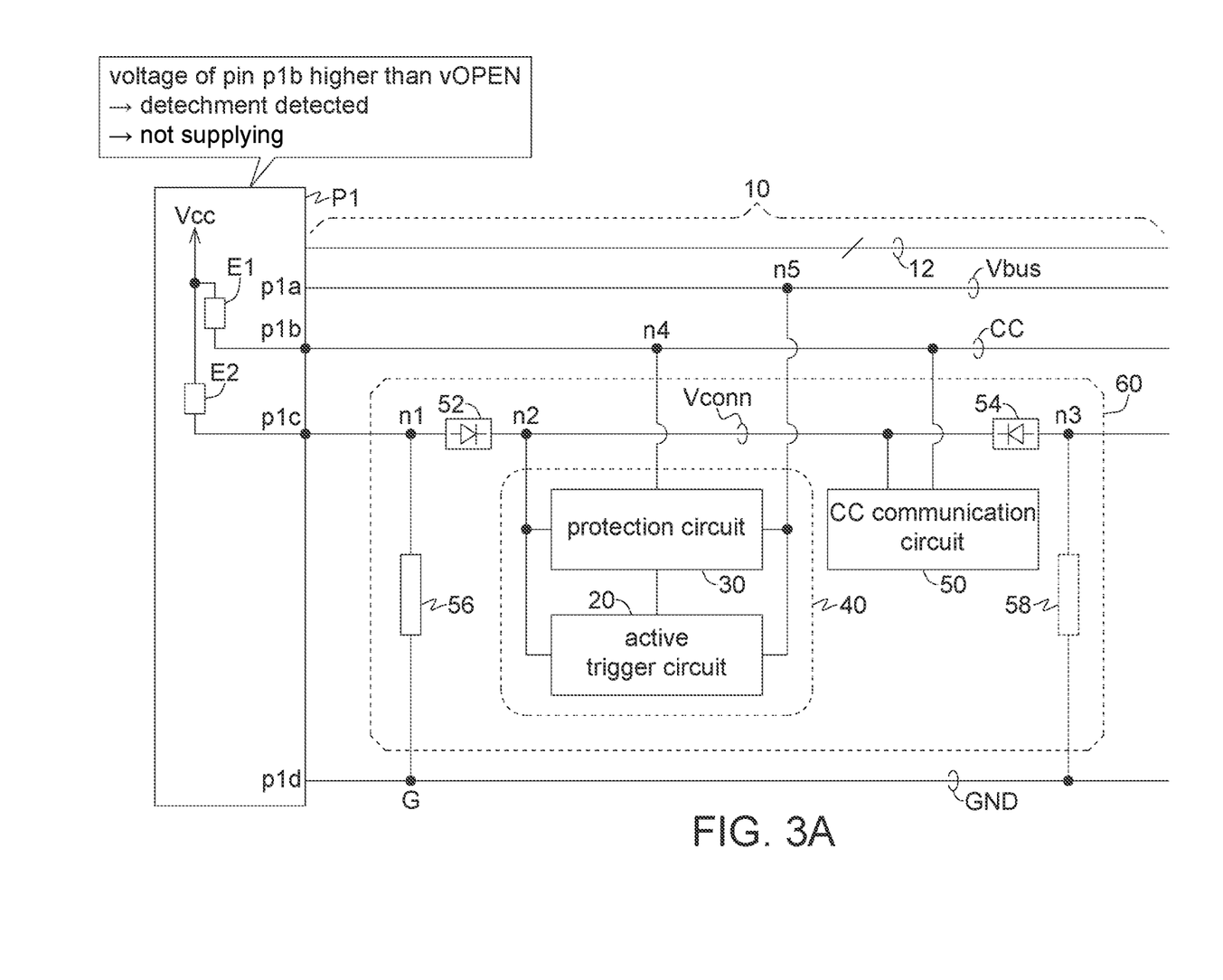
FIGS. 3A-3C are schemes illustrating operations of the cable shown in FIG. 1.
Figure 3B:
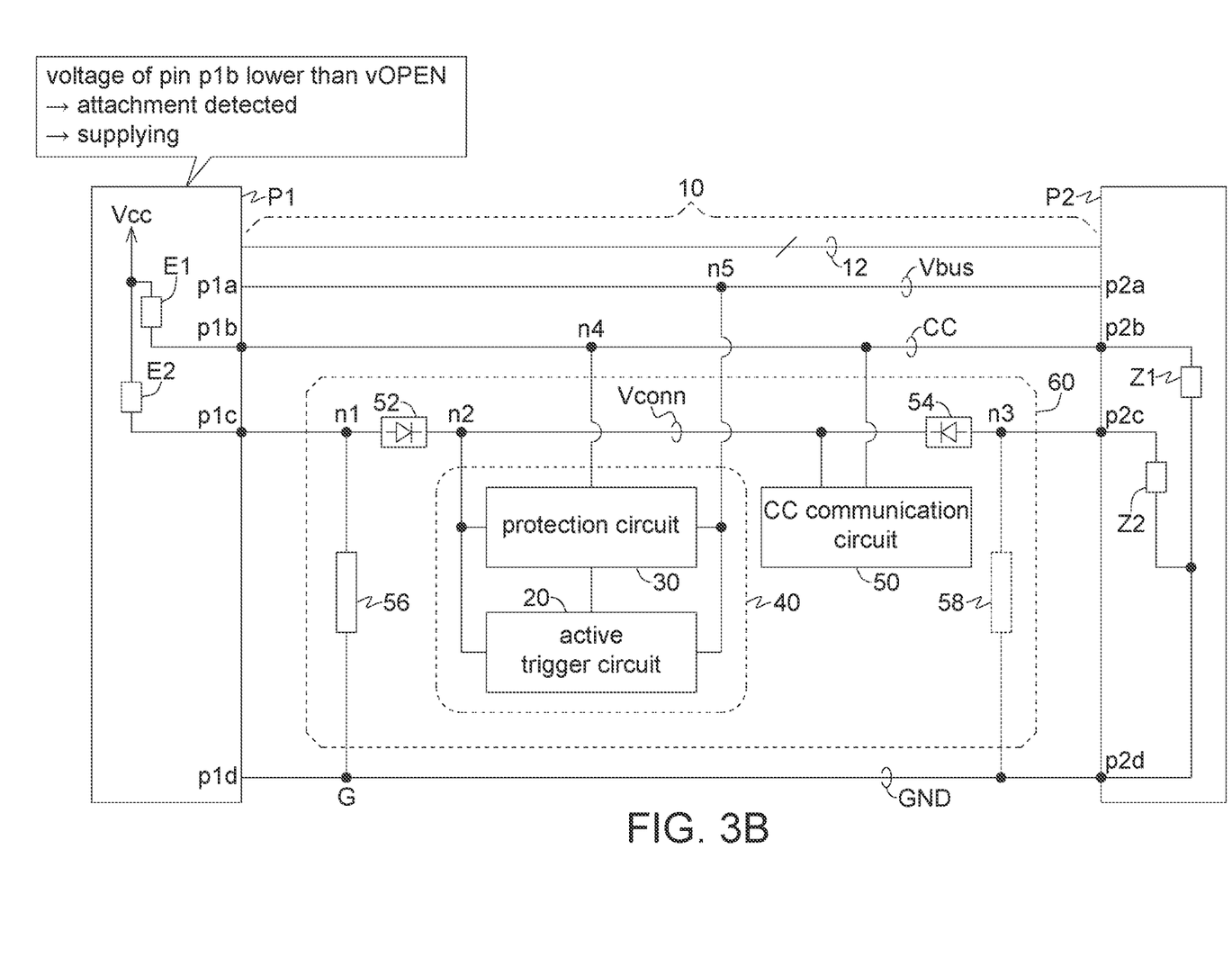
Figure 3C:
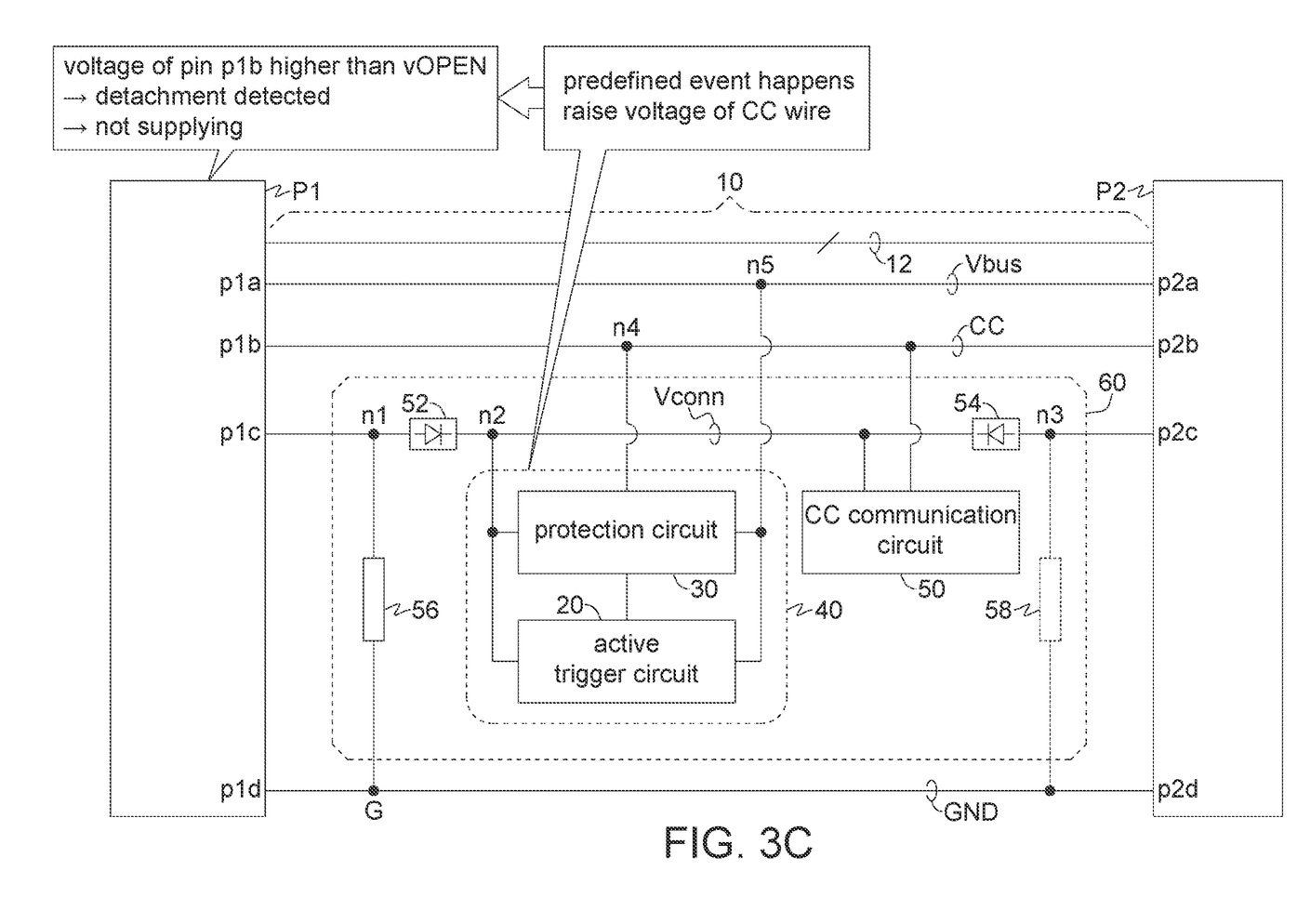

To overcome aforementioned disadvantages of USB PD (and USB type-C) specification, the eMarker 60 of the invention is equipped with the active protection module 40, which can actively initiate a supply safety mechanism of the invention. The active protection module 40 includes an active trigger circuit 20 and a protection circuit 30. The CC communication circuit 50, the active trigger circuit 20 and the protection circuit 30 may also be coupled to the Vconn and Vbus wires, so as to drain required operations power from the Vconn or Vbus wire. The protection circuit 30 may further be coupled to the active trigger circuit 20, and coupled to the CC wire at the node n4. Along with FIG. 1, please refer to FIG. 2 and FIGS. 3A to 3C. FIG. 2 illustrates a flowchart 200 according to an embodiment of the invention. The eMarker 60 in the cable 10 executes the flowchart 200 to actively initiate the supply safety mechanism of the invention. FIGS. 3A to 3C illustrate operations of the cable 10 and the ports P1 and P2. It is understood that FIGS. 3A to 3C is only an example of the invention, and any other embodiment allowing the CC communication circuit 50 and the active protection module 40 of the eMarker 60 to drain power and start operating may implement the supply safety mechanism of the invention. In an embodiment, a required operation power of the eMarker 60 is provided via the Vconn wire or the Vbus wire. In another embodiment, the operation power of the eMarker 60 is provided by an external battery or charger (not shown). In the following embodiment, an example with the eMarker 60 powered via the Vconn wire is discussed.

As shown in FIG. 3A, in the port P1 which operates as a source, the pins p1b and p1c is coupled to a high voltage Vcc (e.g., a 3.3V or 5V dc voltage) respectively via two internal elements E1 and E2. Each of the internal elements E1 and E2 is a resistor (e.g., the resistor Rp defined in USB type-C specification) or a current source (e.g., the current source Ip defined in USB type-C specification). The port P1 monitors voltages of the pins p1b and p1c to detect if there is another port attached to the port P1. In FIG. 3A, the port P1 already connects the cable 10, but there is no other port connecting the port P1 via the cable 10. Because the node n1 coupled to the pin p1c is also coupled to the GND wire and the ground pin p1d via the impedance 56, the voltage of the pin p1c will be pulled down. On the other hand, the CC wire coupled to the pin p1b does not have any conductive path to the GND wire, so the voltage of the pin p1b is not pulled down, and will therefore be higher than a predefined open-circuit voltage (e.g., the voltage vOPEN defined in USB type-C specification). Because the voltage of the pin p1b is higher than the predefined open-circuit voltage, the port P1 may determine that there is no other port attached to the port P1. If there is no attachment detected, the port P1 will not supply power (voltage and current) to the Vbus wire.

In FIG. 3B, the sink port P2 connects the port P1 via the cable 10. In the port P2, the pins p2b and p2c are coupled to the ground pin p2d respectively via two internal impedances Z1 and Z2, wherein each of the internal impedances Z1 and Z2 may be a resistor (e.g., the resistor Rd defined in USB type-C specification). Hence, when the port P2 connects the port P1 via the cable 10, the CC wire, which is coupled to the pin p1b, is coupled to the grounding GND wire, which is coupled to the pin p2d, via the impedance Z1. A voltage of the pin p1b is therefore pulled down to be lower than the aforementioned predefined open-circuit voltage. When the port P1 detects that the voltage of the pin p1b is lower than the predefined open-circuit voltage, the port P1 determines that there is another port P2 attached to the port P1. Then, the port P1 supplies power to the port P2 via the Vbus wire in the cable 10. The port P1 or P2 supplies power to the Vconn wire via the node n1 or n3, such that the CC communication circuit 50 and the active protection module 40 in the eMarker 60 can drain power from the Vconn wire to start operating, and the active protection module 40 executes the flowchart 200 shown in FIG. 2. Main steps of the flowchart 200 will be described as follows.

Step 202: as shown in FIG. 3B, when the port P1 supplies power to the port P2 via the cable 10, the eMarker 60 starts the flowchart 200, and the active protection module 40 proceeds to Step 204 to implement the supply safety mechanism of the invention. In addition, the CC communication circuit 50 performs bi-phase mark coded communication defined in USB PD over the CC wire, including: receiving SOP' (with SOP denoting start of packet) packets sent by the port P1 or P2, and sending SOP' packets in return. However, it is emphasized that the packets transmissions between the ports P1 and P2 are not mandatory nor necessary for the supply safety mechanism of the invention to start and proceed. Whether the packets transmissions between the ports P1 and P2 occur or not, the eMarker 60 may independently implement the supply safety mechanism of the invention, as long as the eMarker 60 is supplied with power.

Step 204: if a predefined event 22 (FIG. 1) happens, then the active trigger circuit 20 in the active protection module 40 triggers the protection circuit 30 to proceed to Step 206. Otherwise, iterate to Step 204. In an embodiment, the predefined event 22 may reflect supply abnormal events of the Vbus wire. For example, as shown in FIG. 1, the predefined event 22 may include an over-voltage protection event 24a, an over-current protection event 24b, an internal over-temperature protection event 24c, an external over-temperature protection event 24d, and an event 24e reflected by impedance sensing, etc. If any of the events occurs, the active protection module 40 proceeds to Step 206.

To detect abnormal events, the active trigger circuit 20 is coupled to the Vbus wire at the node n5, so as to determine whether the predefined event 22 happens according to one or more supply characteristics (e.g., current, voltage and/or temperature) of the Vbus wire. For example, if voltage of the Vbus wire is too high (higher than a safety voltage value), the active trigger circuit 20 determines that the over-voltage protection event 24a has happened. If a current of the Vbus wire is too large (larger than a safety current value), the active trigger circuit 20 determines that the over-current protection event 24b has happened. In addition, the eMarker 60 may sense temperature according to changes of its semiconductor characteristics. For example, the eMarker 60 has an internal temperature sensor to sense chip internal temperature. If the temperature is too high (higher than an internal safety temperature), the active trigger circuit 20 determines that the internal over-temperature event 24c has happened. In an embodiment, the eMarker 60 may connect to an external temperature sensor (e.g., a thermistor, not shown) to sense temperature. If the temperature is too high (higher than a safety temperature), the active trigger circuit 20 determines that the external over-temperature event 24d has happened. In an embodiment, the eMarker 60 may sense a supply characteristic of the Vbus wire by an impedance (not shown) coupled to the Vbus wire. For example, if a cross voltage of the impedance is too high, it may reflect that a current of the Vbus wire is too large, and the active trigger circuit 20 determines that the event 24e reflected by impedance sensing has occurred.

Step 206 (FIG. 2): as shown in FIG. 3C, the active trigger circuit 20 triggers the protection circuit 30 when the predefined event 22 happens. The protection circuit 30 changes an electric characteristic of the CC wire when triggered, such that the source port P1 detects that the sink port P2 has detached, even though the ports P1 and P2 actually still remains connected via the cable 10. In an embodiment, the protection circuit 30 raises the voltage of the CC wire to exceed the predefined open-circuit voltage mentioned in FIGS. 3A and 3B (e.g., the voltage vOPEN defined in USB type-C specification). Since the voltage vOPEN defined in USB type-C specification is 1.65V or 2.75V, in an embodiment of Step 206, when the predefined event 22 happens, the protection circuit 30 causes the voltage of the CC wire to be higher than the maximum one of multiple predefined open-circuit voltages, e.g., higher than 2.75V. In an embodiment, the protection circuit 30 may couple the CC wire to the Vconn wire or the Vbus wire when the active trigger circuit 20 triggers, and utilize the voltage of the Vconn wire or the Vbus wire to cause the voltage of the CC wire to be higher than the predefined open-circuit voltage, because the voltage supplied to the Vconn wire or the Vbus wire will be higher than the predefined open-circuit voltage.

As explained by FIG. 3A, when the port P1 detects that the voltage of the pin p1b is higher than the predefined open-circuit voltage, the port P1 will determine that there is no other port attached to the port P1, and the port P1 will not supply power to the Vbus wire due to absence of attachment. Therefore, in FIG. 3C, when the predefined event happens and the protection circuit 30 raises the voltage of the CC wire to exceed the predefined open-circuit voltage, the port P1 will also detect that the voltage of the pin p1b is higher than the predefined open-circuit voltage, and determine that the port P2 has been detached, even though the port P2 remains connected to the port P1 via the cable 10.

Step 208: when the source port P1 detects that the sink port P2 has been detached, the port P1 will stop supplying power to the Vbus wire. Accordingly, the supply abnormal event stops, and the supply safety mechanism of the invention can be achieved while the flowchart 200 ends. When the port P1 stops supplying power to the Vbus wire, power supplied to the Vconn wire also stops, and the eMarker 60 stop operating. Afterwards, since the port P2 remains connected to the port P1 via the cable 10, the port P1 redetects that the port P2 is attached, and restarts supplying power to the Vbus wire. The flowchart 200 may also start again. In an embodiment, the cable 10 may be unplugged and plugged again between the ports P1 and P2, so the flowchart 200 is executed again.

The above-described eMarker 60 is generally integrated into one of the opposite terminals of the cable 10, e.g. disposed in the shells of a connector (not shown) coupled to the ports P1 or P2. In consideration of the cost-down issue, the eMarker 60 is equipped in only one of the connector shells of the cable 10, and thus only the supply characteristic, e.g. temperature, of one of the ports and the corresponding connector shell can be monitored. In other words, if the oppositely disposed port and/or its corresponding connector shell suffer from an overtemperature, it would be unable to be timely noticed as the above-described internal temperature sensor cannot detect the temperature variation at such a distant end. If the power cannot be interrupted upon occurrence of overtemperature, damage might happen. Therefore, it is desirable to equip the eMarker 60 in each of the connector shells of the cable 10 to timely and accurately detect the supply characteristic of the cable 10.

Figure 4:
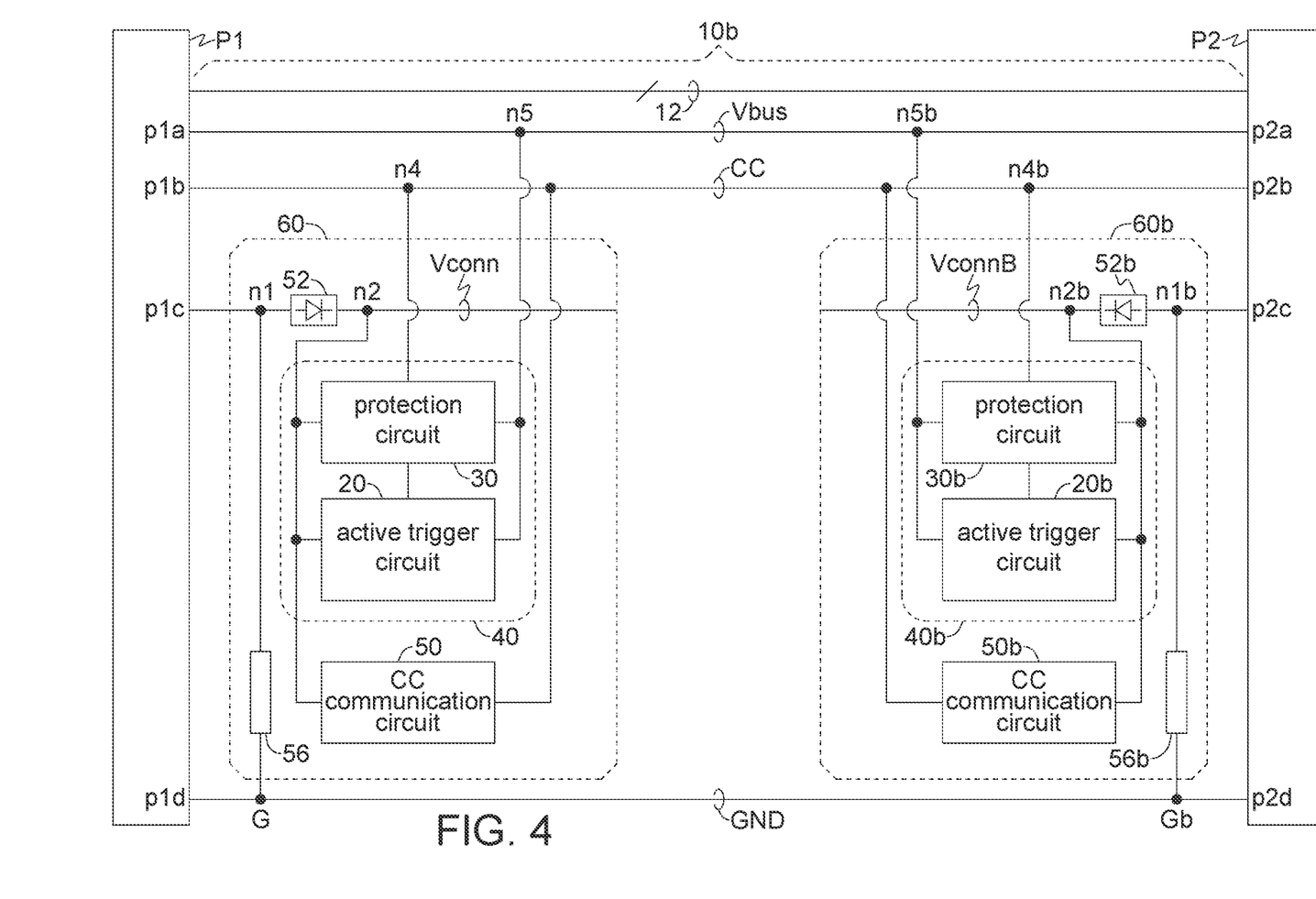
FIG. 4 is a schematic circuit block diagram illustrating a cable including an eMarker device according to another embodiment of the present invention.

Please refer to FIG. 4 illustrating a cable 10b and two pieces of eMarkers 60 and 60b according to an embodiment of the invention. The cable 10b may be a USB type-C cable, for connecting two ports P1 and P2. The ports P1 and P2 respectively belong to different electronic devices (not shown). The cable 10b includes the eMarkers 60 and 60b, a CC wire, at least a Vbus wire and at least a GND wire. The Vbus wire is a bus power wire. The CC wire is a configuration channel wire, and the GND wire is a ground wire. The cable 10b may also include multiple data wires 12 for supporting USB data interconnect, e.g., a pair of differential signal wires for supporting high-speed interconnect of USB 2.0, several sideband signal wires and/or multiple differential signal wires for supporting SuperSpeed interconnect of USB 3.1.

The port P1 may include pins p1a to p1d, wherein the pin p1a may be a Vbus pin defined in USB type-C specification, the pin p1d may be a GND pin defined in USB type-C specification, the pin p1b may be one of CC1 and CC2 pins defined in USB-type-C specification, and the pin p1c may be the other one of the CC1 and CC2 pins. Similarly, the port P2 may include pins p2a to p2d, wherein the pin p2a may be a Vbus pin defined in USB type-C specification, the pin p2d may be a GND pin defined in USB type-C specification, the pin p2b may be one of CC1 and CC2 pins defined in USB-type-C specification, and the pin p2c may be the other one of the CC1 and CC2 pins.

When the ports P1 and P2 connect via the cable 10b, the pin p1a of the port P1 is coupled to the pin p2a of the port P2 via the Vbus wire, the pin p1b of the port P1 is coupled to the pin p2b of the port P2 via the CC wire, and the pin p1d of the port P1 is coupled to the pin p2d of the port P2 via the GND wire.

In addition, the cable 10b may further include isolation elements 52 and 52b. The isolation element 52 is arranged on a Vconn wire, and coupled between nodes n1 and n2. The isolation element 52b is arranged on a VconnB wire, and coupled between nodes n1b and n2b. When the ports P1 and P2 connect via the cable 10b, the pin p1c of the port P1 are coupled to the node n1, and the pin p2c of the port P2 are coupled to the node n1b.

The cable 10b may further include two impedances 56 and 56b. The impedance 56 is coupled between the node n1 and a node G of the GND wire, and the impedance 56b is coupled between the node n1b and a node Gb of the GND wire. When the cable 10b connects the port P1, the cable 10b presents a terminal resistor, e.g., the resistor Ra defined in USB type-C specification, between the nodes n1 and G by the impedance 56. Similarly, when the cable 10b connects the port P2, the cable 10b presents a terminal resistor, e.g., the resistor Ra defined in USB type-C specification, between the nodes n1b and G by the impedance 56b.

The eMarker 60 of the cable 10b may include a CC communication circuit 50 coupled to the CC wire at a node n4, and further include an active protection module 40 to implement the invention. Similarly, the eMarker 60b may include a CC communication circuit 50b coupled to the CC wire at a node n4b, and further include an active protection module 40b to implement the invention. The active protection module 40 may include an active trigger circuit 20 and a protection circuit 30, while the active protection module 40b may include an active trigger circuit 20b and a protection circuit 30b. The CC communication circuit 50, the active trigger circuit 20 and the protection circuit 30 may be coupled to the Vconn and Vbus wires, so as to drain required operation power from the Vconn or Vbus wire. The protection circuit 30 may also be coupled to the active trigger circuit 20, and coupled to the CC wire at the node n4. The protection circuit 30b may also be coupled to the active trigger circuit 20b, and coupled to the CC wire at the node n4b. The CC communication circuit 50b, the active trigger circuit 20b and the protection circuit 30b may be coupled to the VconnB and Vbus wires, so as to drain required operation power from the VconnB or Vbus wire. FIG. 4 merely illustrates an embodiment of the invention, while any arrangement which allows the CC communication circuits 50 and 50b and the active protection modules 40 and 40b to drain power and start operation may be utilized to implement the supply safety mechanism of the invention. In an embodiment, required operation power of the eMarkers 60 and 60b may be provided via the Vconn wire or the Vbus wire. In another embodiment, operation power of the eMarkers 60 and 60b may be provided by an external battery or charger (not shown). In the following embodiment, an example with the eMarkers 60 and 60b powered respectively via the Vconn wire and the VconnB wire is discussed.

In an embodiment implemented according to FIGS. 4-7 and associated descriptions of USB type-C specification release 1.2, at least one of the active protection modules 40 and 40b may execute steps 204 and 206 shown in FIG. 2. When the ports P1 and P2 mutually connect via the cable 10b, one of the ports P1 and P2 supplies power to the other via the Vbus wire of the cable 10b, and only one of the eMarkers 60 and 60b drains power, such that the corresponding one of the active protection modules 40 and 40b executes steps 204 and 206 shown in FIG. 2. The active trigger circuit 20 (or 20b) may be coupled to the Vbus wire at a node n5 (or n5b) to determine whether a supply abnormal event happens according to supply characteristic (e.g., current, voltage, temperature, etc.) of the Vbus wire, and trigger the protection circuit 30 (or 30b) when the abnormal event happens (step 204), such that the protection circuit 30 (or 30b) raises voltage of the CC wire to exceed the predefined open-circuit voltage (step 206), and causes the source port to detect a detachment when the two ports still remain physically connected, and therefore stop supplying power to the Vbus wire. As a result, the abnormal event can be stopped. The supply safety mechanism of the invention can be effectively implemented even if there is only one of the active protection modules 40 and 40b to raise the voltage of the CC wire to exceed the predefined open-circuit voltage when an abnormal event occurs. However, as mentioned above, in the circuitry shown in FIG. 4, only one of the eMarker 60 and eMarker 60b, e.g. the one which connects to the corresponding port first, can drain power at a same time point, and it is not possible to activate the eMarker 60 and eMarker 60b simultaneously. It is inherent that only one of the terminals of the cable 10 can be monitored to realize the supply characteristics, e.g. temperature, at the corresponding port and connector shell, and the abnormal events, e.g. overtemperature, at the other terminal cannot be timely noted by the distant internal temperature sensor. As a result, preventive power interruption cannot be timely executed and damage might thus occur.

For improvement, a new invention is developed. An embodiment of the invention will be described hereinafter with reference to FIG. 5. This embodiment may be implemented according to FIGS. 5-7 and associated description of USB type-C specification release 1.2, both the active protection modules 40 and 40b may execute steps 204 and 206 shown in FIG. 2. The embodiment shown in FIG. 5 differs from the embodiment shown in FIG. 4 in that the pin p1c of the port P1 and the pin p2c of the port P2 are electrically connected to each other via the same Vconn wire. As such, no matter whether power is supplied through the pin p1c of the port P1 or the pin p2c of the port P2, both the eMarker 60 and eMarker 60b can drain power.

Figure 5:
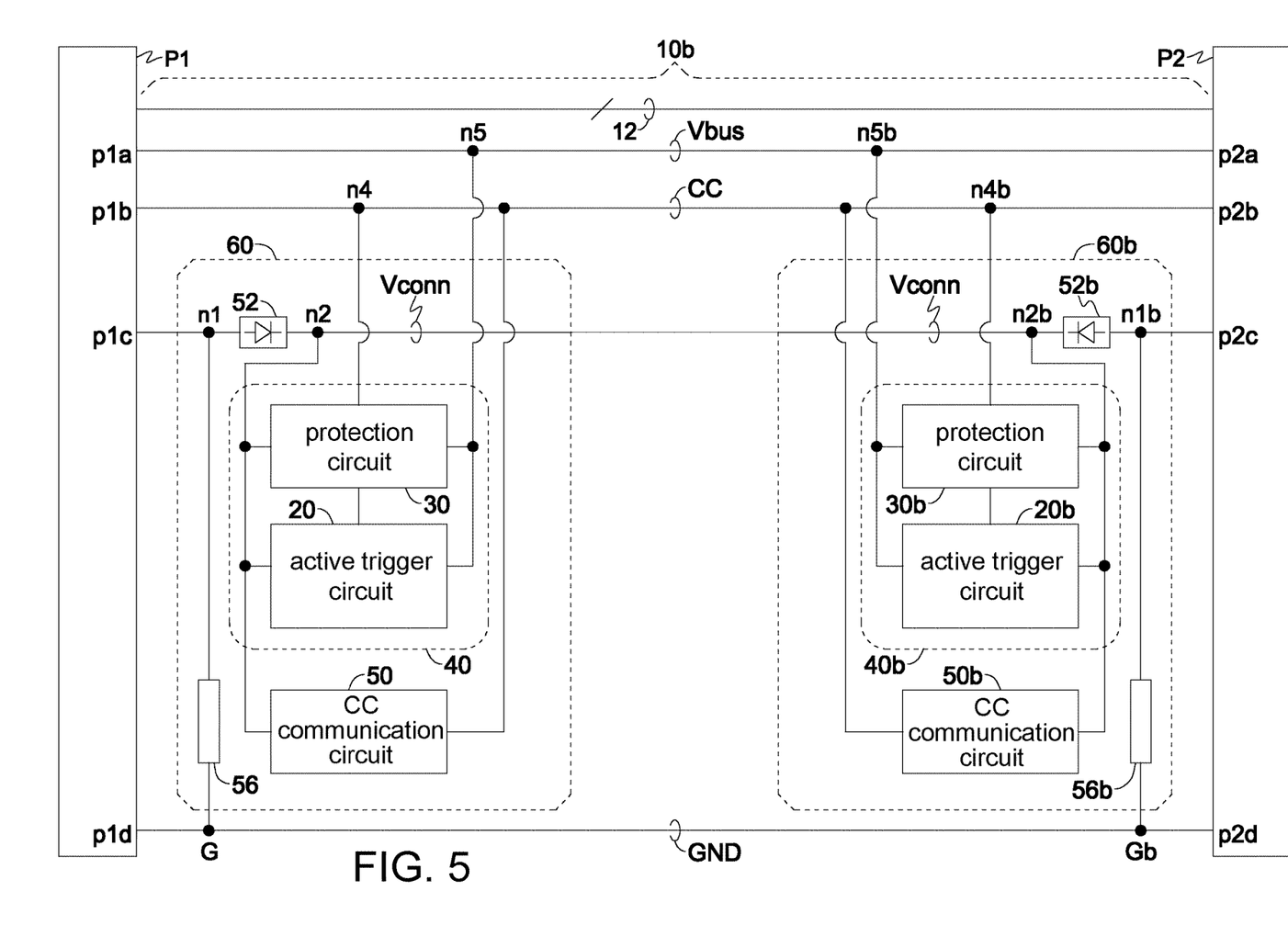
FIG. 5 is a schematic circuit block diagram illustrating a cable including an eMarker device according to another embodiment of the present invention.

According to the specification, both the eMarker 60 and eMarker 60b execute BMC (bi-phase mark coded) communication via the common CC wire with different SOPs (start of packet), e.g. SOP' and SOP''' to indicate different devices. The CC communication circuit 50 receives an SOP' from the port P1 or the port P2 through the CC wire, and sends a SOP' in response. On the other hand, the CC communication circuit 50b receives an SOP''' from the port P1 or the port P2 through the CC wire, and sends a SOP''' in response. The architecture supports a bi-directional current flow between the port P1 and the port P2, so it is required that both the CC communication circuit 50 and the CC communication circuit 50b correctly respond to the SOP' and the SOP''', respectively. The circuitries of the eMarker 60 and eMarker 60b might thus be a little complicated.

Figure 6:
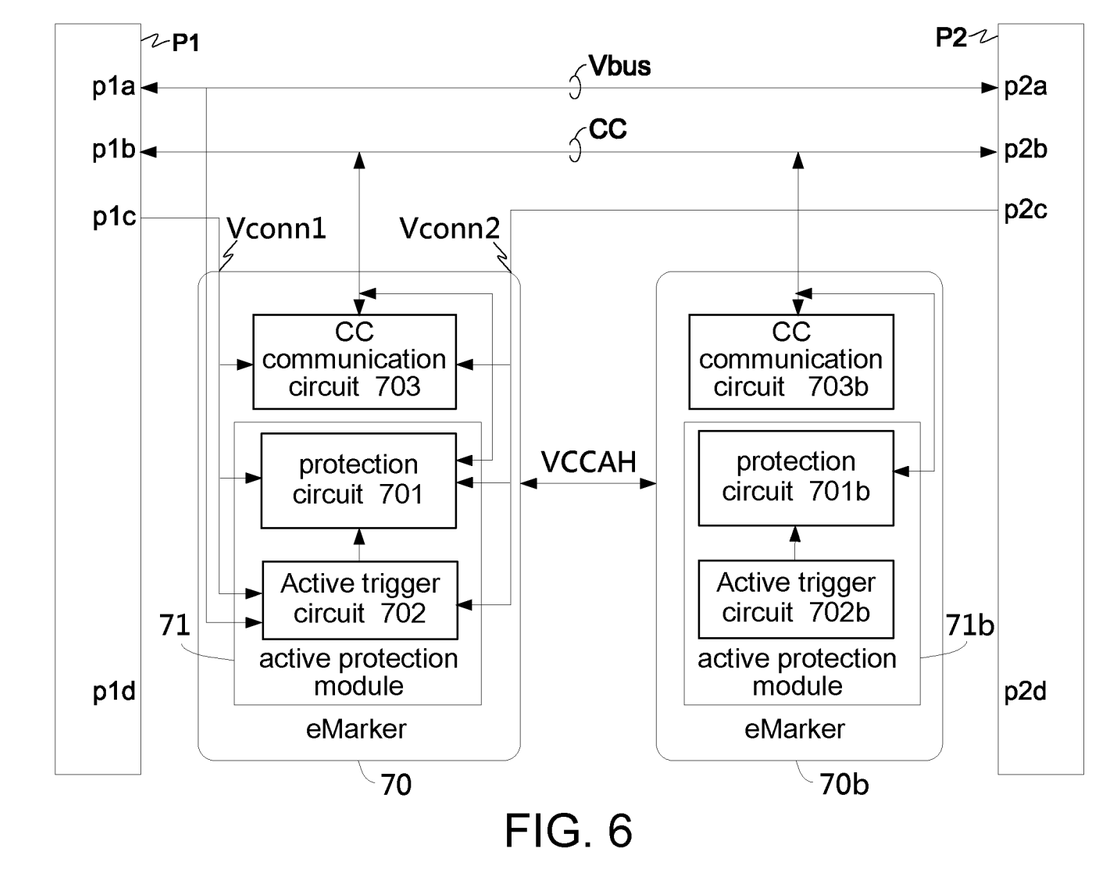
FIG. 6 is a schematic circuit block diagram illustrating a cable including an eMarker device according to a further embodiment of the present invention.

A cable with simplified eMarkers while achieving similar objects is developed and described with reference to FIG. 6. As shown, an eMarker device includes an eMarker 70 and an eMarker 70b, which are disposed near the port P1 and the port P2, respectively. The ports P1 and P2 play the roles of a source and a sink, respectively and interchangeably. The Vconn source is provided by the port P1, or interchangeably, the port P2. In this embodiment, only one of the eMarker 70 and eMarker 70b is coupled to both the pin p1c of the port P1 and the pin p2c of the port P2 via pins Vconn1 and Vconn2. In the example shown in FIG. 6, it is the eMarker 70 coupled to the pin p1c of the port P1 and the pin p2c of the port P2 via the pins Vconn1 and Vconn2, respectively. Under this circumstance, the Vconn source, which may be the port P1 or the P2, can supply power to the eMarker 70 through the corresponding pin, e.g. the pin Vconn1 or Vconn2, to support normal operations of an active protection module 71, which includes an active trigger circuit 702 and a protection circuit 701. Furthermore, in order to have the eMarker 70b acquire power to work normally, an internal power line VCCAH is disposed in the cable between the eMarker 70 and the eMarker 70b. Through the internal power line VCCAH, the eMarker 70b can drain power from the eMarker 70.

The active trigger circuit 702 of the eMarker 70 is coupled to the Vbus wire and disposed near the port P1. The active trigger circuit 702 determines whether an abnormal event occurs according to a supply characteristic of the Vbus wire and a temperature detected at a place where the active trigger circuit 702 is located. If it is determined that an abnormal event happens, the active trigger circuit 702 triggers the protection circuit 701 to have the protection circuit 701 raise the voltage of the CC communication wire to a level higher than the predefined open-circuit voltage. Then the source port will detect a disconnecting status so as to interrupt power supply through the Vbus wire, even if the two ports actually stay connected. Accordingly, the abnormal event can be ceased.

On the other hand, an active trigger circuit 702b of the eMarker 70b need not be coupled to the Vbus wire or Vconn1 or Vconn2, but need be disposed near the port P2. The active trigger circuit 702b determines whether an abnormal event occurs according to a temperature detected at a place where the active trigger circuit 702b is located. If it is determined that an abnormal event happens, the active trigger circuit 702b triggers the protection circuit 701b of an active protection module 71b of the eMarker 70b to have a protection circuit 701b of an active protection module 71b of the eMarker 70b raise the voltage of the CC communication wire to a level higher than the predefined open-circuit voltage. Then the source port will detect a disconnecting status so as to interrupt power supply through the Vbus wire, even if the two ports actually stay connected. Accordingly, the abnormal event can be ceased.

It is understood from the above descriptions and the accompanying drawings, both the eMarker 70 and eMarker 70b are electrically connected to the CC wire, and share the CC wire for BMC communication. For simplifying circuitry and operations, both the CC communication circuit 703 of the eMarker 70 and the CC communication circuit 703b of the eMarker 70b may be designed to be responsive to only SOP' without responding to SOP'''.

To avoid errors, the CC communication circuit 703 and the CC communication circuit 703b are set to be operable under a specific condition. If the specific condition is not satisfied, the CC communication circuit 703 and the CC communication circuit 703b will be disabled. For example, the specific condition is normal connection of the pins Vconn1 and Vconn2 to the pins p1c and p2c, respectively, at the source port. Take FIG. 6 as an example. The pins Vconn1 and Vconn2 of the eMarker 70 is electrically connected to the pin p1c of the port P1 and the pin p2c of the port P2, respectively. Therefore, the CC communication circuit 703 will be enabled to operate normally, and the function of response to SOP' can normally performed. In contrast, the pins Vconn1 and Vconn2 of the eMarker 70b are not connected to any power source, i.e. the specific condition is not satisfied, so the SOP'-responding function of the CC communication circuit 703b is disabled. As a result, the CC communication circuit 703b will not respond to the SOP' transmitted on the CC wire, and only the CC communication circuit 703 responds to the SOP' transmitted on the CC wire, thereby avoiding errors. It is to be noted that the specific condition may alternatively set to have the CC communication circuit complying with the specific condition disabled while having the other CC communication circuit enabled. Briefly, as long as only one of the CC communication circuits is working at the same time point, errors can be avoided.

Alternatively, the specific condition is successful acquisition of power from another eMarker through the internal power line VCCAH. For example, once the eMarker 70b can acquire power from the eMarker 70, the function of response to SOP' of the CC communication circuit 703b is disabled. The function of response to SOP' can be disabled in one or more of the following ways. In a first example, the receiving and responding functions of the CC communication circuit 703b are both disabled. In a second example, the receiving function of the CC communication circuit 703b remains enabled while the function of response to SOP' is disabled. In a third example, the power of the CC communication circuit 703b is interrupted. In a further embodiment, the CC communication circuit 703b is omitted from the eMarker 70b. The eMarker 70b without a CC communication circuit is equipped in the cable 10 along with the eMarker 70 with the CC communication circuit 703. Furthermore, it is also feasible that the specific condition is successful acquisition of power through the internal power line VCCAH. When it is determined that the power is drained from the internal power line VCCAH, the function of response to SOP' remains enabled. Otherwise, the function of response to SOP' is disabled.

Figure 7:
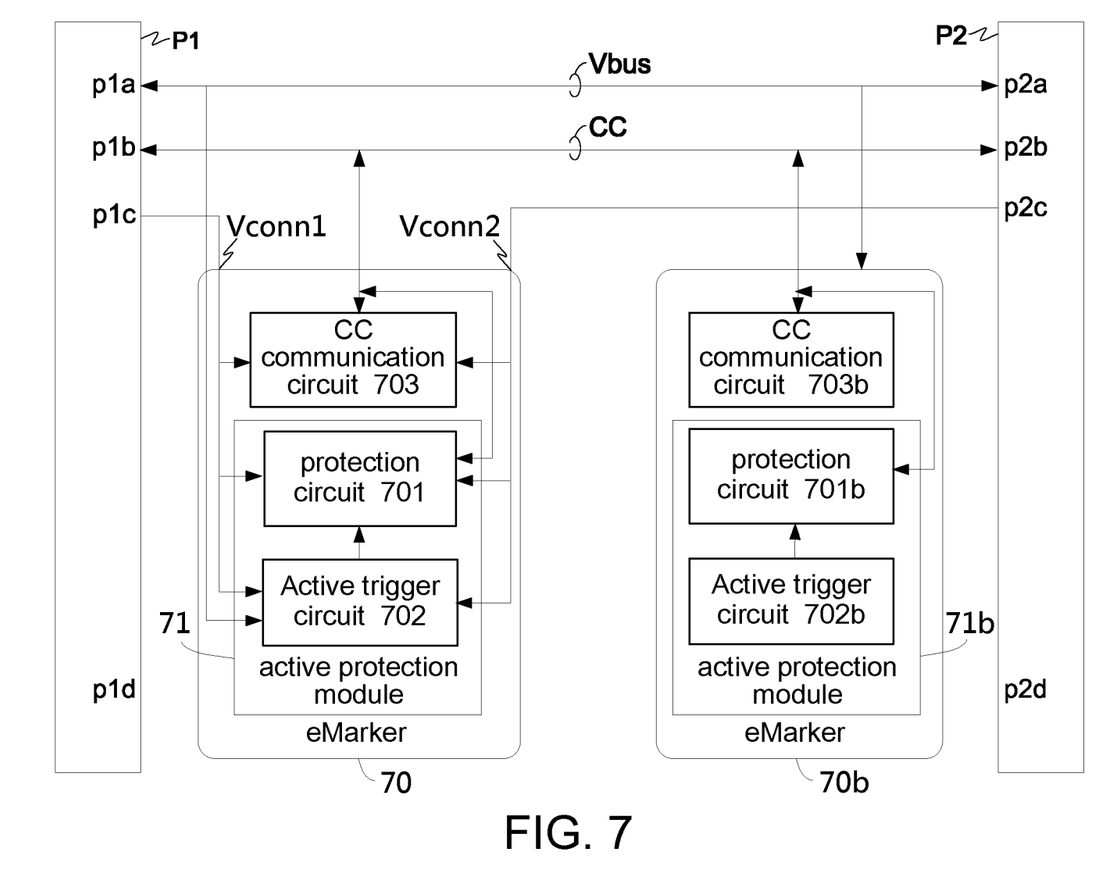
FIG. 7 is a schematic circuit block diagram illustrating a cable including an eMarker device according to still another embodiment of the present invention.

Referring to FIG. 7, another embodiment according to the present invention is illustrated. An eMarker device includes an eMarker 70 and an eMarker 70b, which are disposed near the port P1 and the port P2, respectively. The ports P1 and P2 play the roles of a source and a sink, respectively and interchangeably. The Vconn source is provided by the port P1, or interchangeably, the port P2. In this embodiment, only one of the eMarker 70 and eMarker 70b is coupled to both the pin p1c of the port P1 and the pin p2c of the port P2 via pins Vconn1 and Vconn2. In the example shown in FIG. 7, it is the eMarker 70 coupled to the pin p1c of the port P1 and the pin p2c of the port P2 via the pins Vconn1 and Vconn2, respectively. Under this circumstance, the Vconn source, which may be the port P1 or the P2, can supply power to the eMarker 70 through the corresponding pin, e.g. the pin Vconn1 or Vconn2, to support normal operations of an active protection module 71, which includes an active trigger circuit 702 and a protection circuit. Furthermore, in order to have the eMarker 70b acquire power to work normally, the eMarker 70b is coupled to the Vbus wire to drain power from the Vbus wire.

The active trigger circuit 702 of the eMarker 70 is coupled to the Vbus wire and disposed near the port P1. The active trigger circuit 702 determines whether an abnormal event occurs according to a supply characteristic of the Vbus wire and a temperature detected at a place where the active trigger circuit 702 is located. If it is determined that an abnormal event happens, the active trigger circuit 702 triggers the protection circuit 701 to have the protection circuit 701 raise the voltage of the CC communication wire to a level higher than the predefined open-circuit voltage. Then the source port will detect a disconnecting status so as to interrupt power supply through the Vbus wire, even if the two ports actually stay connected. Accordingly, the abnormal event can be ceased.

On the other hand, an active trigger circuit 702b of the eMarker 70b is coupled to the Vbus wire, and needs to be disposed near the port P2. The active trigger circuit 702b determines whether an abnormal event occurs according to a temperature detected at a place where the active trigger circuit 702b is located. If it is determined that an abnormal event happens, the active trigger circuit 702b triggers the protection circuit 701b of an active protection module 71b of the eMarker 70b to have a protection circuit 701b of an active protection module 71b of the eMarker 70b raise the voltage of the CC communication wire to a level higher than the predefined open-circuit voltage. Then the source port will detect a disconnecting status so as to interrupt power supply through the Vbus wire, even if the two ports actually stay connected. Accordingly, the abnormal event can be ceased.

It is understood from the above descriptions and the accompanying drawings, both the eMarker 70 and eMarker 70b are electrically connected to the CC wire, and share the CC wire for BMC communication. For simplifying circuitry and operations, both the CC communication circuit 703 of the eMarker 70 and the CC communication circuit 703b of the eMarker 70b may be designed to be responsive to only SOP' without responding to SOP".

To avoid errors, the CC communication circuit 703 and the CC communication circuit 703b are set to be operable under a specific condition. If the specific condition is not satisfied, the CC communication circuit 703 and the CC communication circuit 703b will be disabled. For example, the specific condition is normal connection of the pins Vconn1 and Vconn2 to the pins p1c and p2c, respectively, at the source port. Take FIG. 6 as an example. The pins Vconn1 and Vconn2 of the eMarker 70 is electrically connected to the pin p1c of the port P1 and the pin p2c of the port P2, respectively. Therefore, the CC communication circuit 703 will be enabled to operate normally, and the function of response to SOP' can normally performed. In contrast, the pins Vconn1 and Vconn2 of the eMarker 70b are not connected to any power source, i.e. the specific condition is not satisfied, so the SOP'-responding function of the CC communication circuit 703b is disabled. As a result, the CC communication circuit 703b will not respond to the SOP' transmitted on the CC wire, and only the CC communication circuit 703 responds to the SOP' transmitted on the CC wire, thereby avoiding errors. It is to be noted that the specific condition may alternatively set to have the CC communication circuit complying with the specific condition disabled while having the other CC communication circuit enabled. Briefly, as long as only one of the CC communication circuits is working at the same time point, errors can be avoided.

The foregoing makes it clear that according to the present invention, the eMarker device and the cable equipped with eMarker device are capable of managing power in an active and safe manner. The power management method executed in the eMarker device and the cable equipped with eMarker device actively and well protects the devices when an abnormal event happens. Furthermore, the functions of the eMarker device and the cable equipped with eMarker device, and the power management method executed in the eMarker device and the cable equipped with eMarker device, are not limited by the USB specification for passive power transmission, and not limited to simple response to a request from the receiving port. Furthermore, it is conventionally required that both the ports P1 and P2 support the USB specification for power transmission. The present invention, in contrast, can actively maintain safe power transmission even if the port P1 and/or the port P2 do not support the USB specification for power transmission. In the devices and method developed according to the present invention, not only the ports interconnected by the cable are protected, but the cable and eMarker device themselves can be protected.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An eMarker device for use in a cable electrically connected between a first port and a second port, the cable including a configuration channel communication wire, and the eMarker device comprising:
    a first eMarker disposed near the first port and including a first active protection module coupled to the configuration channel communication wire, wherein the first eMarker is electrically connected to a first power pin of the first port and a second power pin of the second port; and
    a second eMarker disposed near the second port and including a second active protection module coupled to the configuration channel communication wire,
    wherein either of the first active protection module and the second active protection module changes an electric characteristic of the configuration channel communication wire to have the first port detect a disconnecting status of the second port when a specified event happens,
    wherein the first active protection module includes a first configuration channel communication circuit, and the second active protection module includes a second configuration channel communication circuit, wherein one of the configuration channel communication circuits is set to be operable while the other one of the configuration channel communication circuits is set to be disabled when a specific condition is satisfied, wherein the specific condition is successful acquisition of power from the first eMarker to the second eMarker.

2. The eMarker device according to claim 1, wherein the specified event is an abnormal temperature event.

3. The eMarker device according to claim 1, wherein the first active protection module includes a first active trigger circuit and a first protection circuit, wherein the first active trigger circuit determines whether the specified event happens according to a temperature detected at a place where the first active trigger circuit is located and a supply characteristic of a bus power wire, and triggers the first protection circuit to raise a voltage of the configuration channel communication wire to a level higher than a predetermined open-circuit voltage, thereby having the first port detect the disconnecting status of the second port and having a power supply through the bus power wire suspended.

4. The eMarker device according to claim 1, wherein the second active protection module includes a second active trigger circuit and a second protection circuit, wherein the second active trigger circuit determines whether the specified event happens according to a temperature detected at a place where the second active trigger circuit is located, and triggers the second protection circuit to raise a voltage of the configuration channel communication wire to a level higher than a predetermined open-circuit voltage, thereby having the first port detect the disconnecting status of the second port.

5. The eMarker device according to claim 1, wherein the second active protection module includes a second active trigger circuit and a second protection circuit, wherein the second active trigger circuit determines whether the specified event happens according to a temperature detected at a place where the second active trigger circuit is located and a supply characteristic of a bus power wire, and triggers the second protection circuit to raise a voltage of the configuration channel communication wire to a level higher than a predetermined open-circuit voltage, thereby having the first port detect the disconnecting status of the second port.

6. The eMarker device according to claim 1, wherein the first and second configuration channel communication circuits are set in a manner that when a specific condition is satisfied, the configuration channel communication circuit is operable, and when the specific condition is dissatisfied, the configuration channel communication circuit is disabled, wherein the specific condition is normal connection to the first power pin of the first port and the second power pin of the second port.

7. The eMarker device according to claim 1, wherein the first and second configuration channel communication circuits are set in a manner that when a specific condition is dissatisfied, the configuration channel communication circuit is operable, and when the specific condition is satisfied, the configuration channel communication circuit is disabled, wherein the specific condition is normal connection to the first power pin of the first port and the second power pin of the second port.

8. The eMarker device according to claim 1, wherein the second eMarker drains power from the first eMarker through an internal power line, or the second eMarker drains power through a bus power wire of the cable.

9. A cable to be electrically connected between a first port and a second port, comprising:
    a configuration channel communication wire;
    a first eMarker disposed near the first port and including a first active protection module coupled to the configuration channel communication wire, wherein the first eMarker is electrically connected to a first power pin of the first port and a second power pin of the second port; and
    a second eMarker disposed near the second port and including a second active protection module coupled to the configuration channel communication wire,
    wherein either of the first active protection module and the second active protection module changes an electric characteristic of the configuration channel communication wire to have the first port detect a disconnecting status of the second port when a specified event happens,
    wherein the first active protection module includes a first configuration channel communication circuit, and the second active protection module includes a second configuration channel communication circuit, wherein one of the configuration channel communication circuits is set to be operable while the other one of the configuration channel communication circuits is set to be disabled when a specific condition is satisfied, wherein the specific condition is successful acquisition of power from the first eMarker to the second eMarker.

10. The cable according to claim 9, wherein the specified event is an abnormal temperature event.

11. The cable according to claim 9, wherein the first active protection module includes a first active trigger circuit and a first protection circuit, wherein the first active trigger circuit determines whether the specified event happens according to a temperature detected at a place where the first active trigger circuit is located and a supply characteristic of a bus power wire, and triggers the first protection circuit to raise a voltage of the configuration channel communication wire to a level higher than a predetermined open-circuit voltage, thereby having the first port detect the disconnecting status of the second port and having a power supply through the bus power wire suspended.

12. The cable according to claim 9, wherein the second active protection module includes a second active trigger circuit and a second protection circuit, wherein the second active trigger circuit determines whether the specified event happens according to a temperature detected at a place where the second active trigger circuit is located, and triggers the second protection circuit to raise a voltage of the configuration channel communication wire to a level higher than a predetermined open-circuit voltage, thereby having the first port detect the disconnecting status of the second port.

13. The cable according to claim 9, wherein the second active protection module includes a second active trigger circuit and a second protection circuit, wherein the second active trigger circuit determines whether the specified event happens according to a temperature detected at a place where the second active trigger circuit is located and a supply characteristic of a bus power wire, and triggers the second protection circuit to raise a voltage of the configuration channel communication wire to a level higher than a predetermined open-circuit voltage, thereby having the first port detect the disconnecting status of the second port.

14. The cable according to claim 9, the first and second configuration channel communication circuits are set in a manner that when a specific condition is satisfied, the configuration channel communication circuit is operable, and when the specific condition is dissatisfied, the configuration channel communication circuit is disabled, wherein the specific condition is normal connection to the first power pin of the first port and the second power pin of the second port.

15. The cable according to claim 9, the first and second configuration channel communication circuits are set in a manner that when a specific condition is dissatisfied, the configuration channel communication circuit is operable, and when the specific condition is satisfied, the configuration channel communication circuit is disabled, wherein the specific condition is normal connection to the first power pin of the first port and the second power pin of the second port.

16. The cable according to claim 9, wherein the second eMarker drains power from the first eMarker through an internal power line, or the second eMarker drains power through a bus power wire of the cable.

17. A power management method of a cable electrically connected between a first port and a second port, the cable comprising a configuration channel communication wire, and the method comprising:
changing an electric characteristic of the configuration channel communication wire with a first eMarker to have the first port detect a disconnecting status of the second port when a first specified event happens near the first port; and
changing an electric characteristic of the configuration channel communication wire with a second eMarker to have the first port detect a disconnecting status of the second port when a second specified event happens near the second port,
wherein the first eMarker includes a first configuration channel communication circuit, and the second eMarker includes a second configuration channel communication circuit,
wherein one of the configuration channel communication circuits is set to be operable while the other one of the configuration channel communication circuits is set to be disabled when a specific condition is satisfied, wherein the specific condition is successful acquisition of power from the first eMarker to the second eMarker.

18. The method according to claim 17, wherein the first specified event or the second specified event is an abnormal temperature event.

19. The method according to claim 17, wherein the first eMarker includes a first active trigger circuit and a first protection circuit, wherein the first active trigger circuit determines whether the specified event happens according to a temperature detected at a place where the first active trigger circuit is located and a supply characteristic of a bus power wire, and triggers the first protection circuit to raise a voltage of the configuration channel communication wire to a level higher than a predetermined open-circuit voltage, thereby having the first port detect the disconnecting status of the second port and having a power supply through the bus power wire suspended.

20. The method according to claim 17, wherein the second eMarker drains power from the first eMarker through an internal power line, or the second eMarker drains power through a bus power wire of the cable.

21. The method according to claim 20, wherein the first eMarker or the second eMarker changes an electric characteristic of the configuration channel communication wire by raising a voltage of the configuration channel communication wire to a level higher than a predetermined open-circuit voltage, thereby having the first port detect the disconnecting status of the second port and having a power supply through the bus power wire of the cable suspended.

22. The method according to claim 20, wherein the second eMarker includes a second active trigger circuit and a second protection circuit, wherein the second active trigger circuit determines whether the specified event happens according to a temperature detected at a place where the second active trigger circuit is located, and triggers the second protection circuit to raise a voltage of the configuration channel communication wire to a level higher than a predetermined open-circuit voltage, thereby having the first port detect the disconnecting status of the second port.

23. The method according to claim 20, wherein the second eMarker includes a second active trigger circuit and a second protection circuit, wherein the second active trigger circuit determines whether the specified event happens according to a temperature detected at a place where the second active trigger circuit is located and a supply characteristic of the bus power wire, and triggers the second protection circuit to raise a voltage of the configuration channel communication wire to a level higher than a predetermined open-circuit voltage, thereby having the first port detect the disconnecting status of the second port.

24. The method according to claim 17, wherein the first and second configuration channel communication circuits are set in a manner that when a specific condition is satisfied, the configuration channel communication circuit is operable, and when the specific condition is dissatisfied, the configuration channel communication circuit is disabled, wherein the specific condition is normal connection to the first power pin of the first port and the second power pin of the second port.

25. The method according to claim 17, wherein the first and second configuration channel communication circuits are set in a manner that when a specific condition is dissatisfied, the configuration channel communication circuit is operable, and when the specific condition is satisfied, the configuration channel communication circuit is disabled, wherein the specific condition is normal connection to the first power pin of the first port and the second power pin of the second port.

* * * * *